Oct. 12, 1965  R. A. CORDIALE ETAL  3,211,815
MOLDED BOTTLE EJECTION APPARATUS AND METHOD
Filed March 5, 1962  3 Sheets-Sheet 1
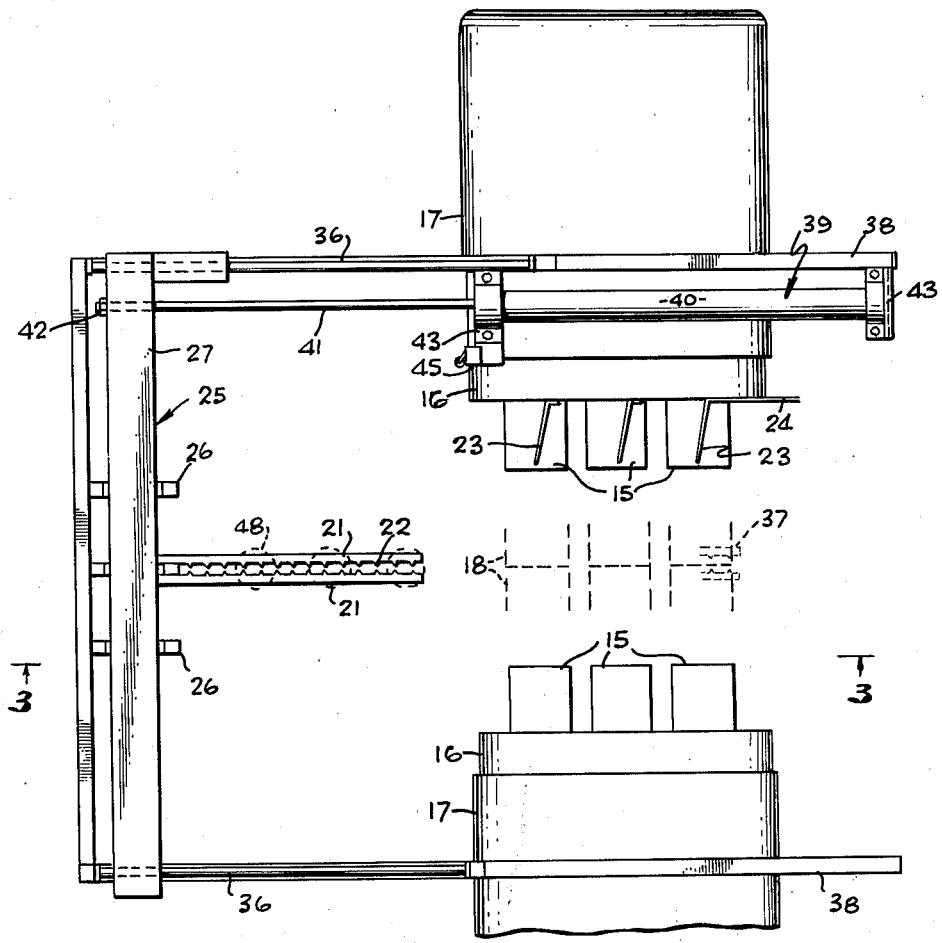
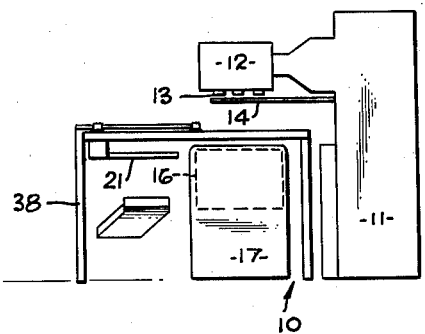
ROY A. CORDIALE
PETER A. PAGAN
JEROME J. SKELLY
INVENTORS
BY *White and Haefliger*
ATTORNEYS

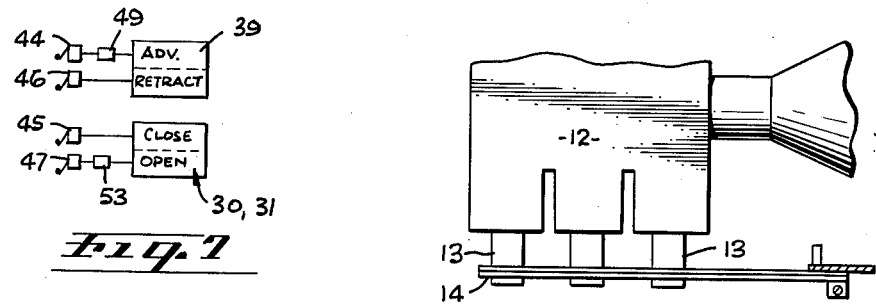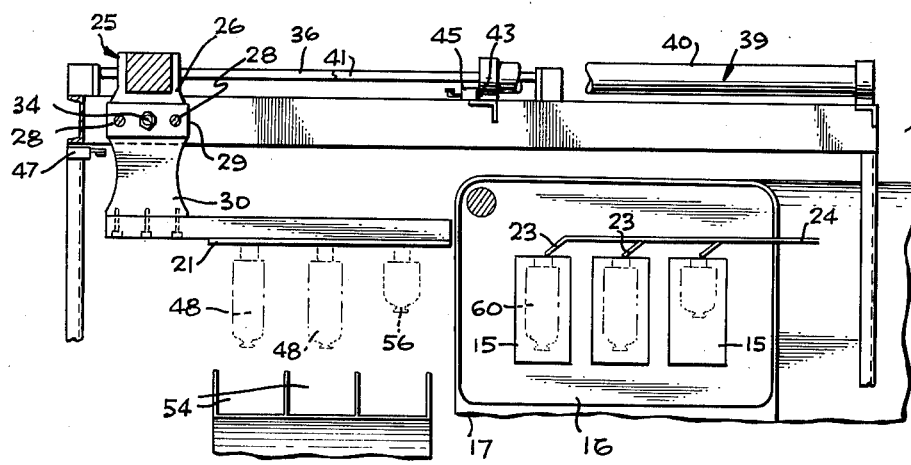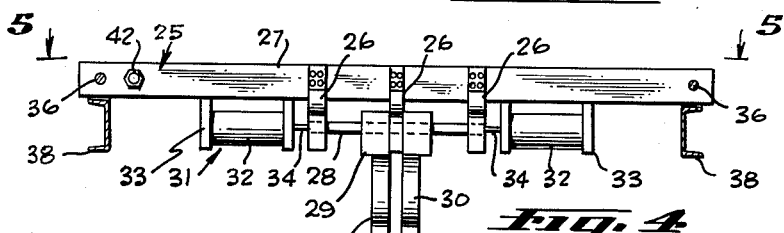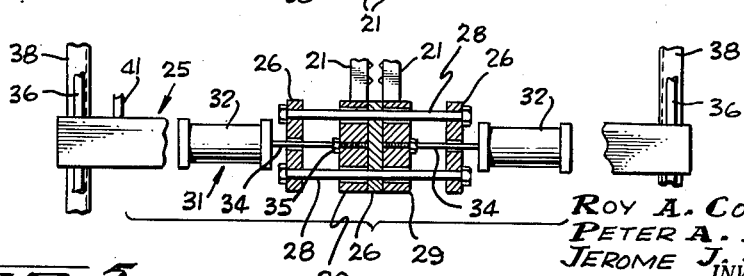

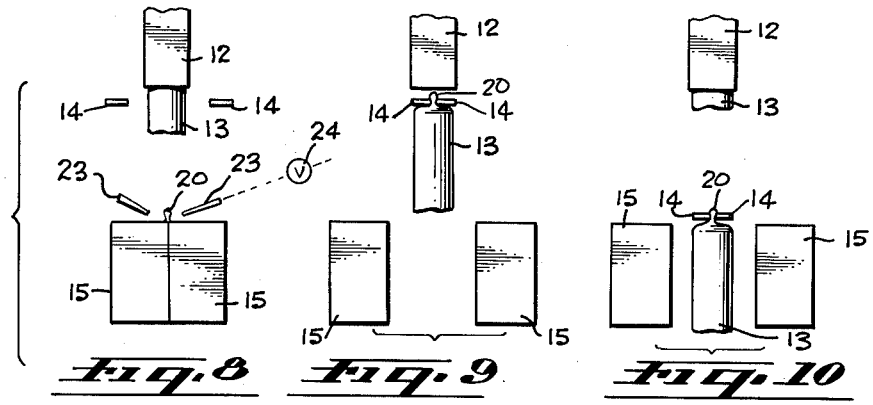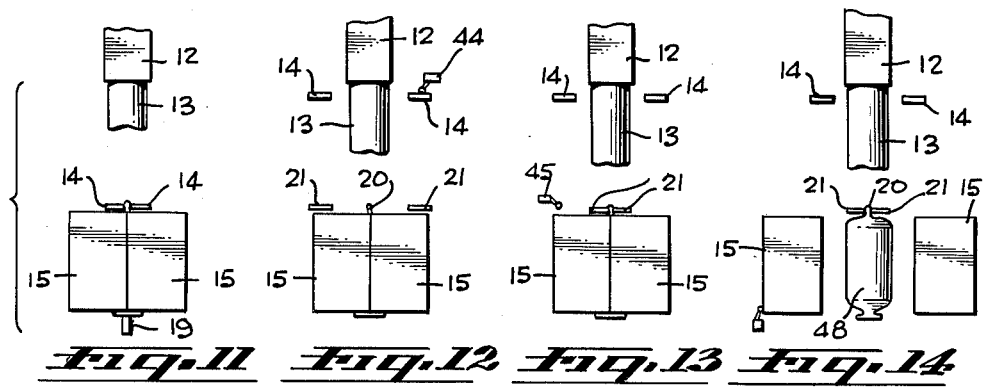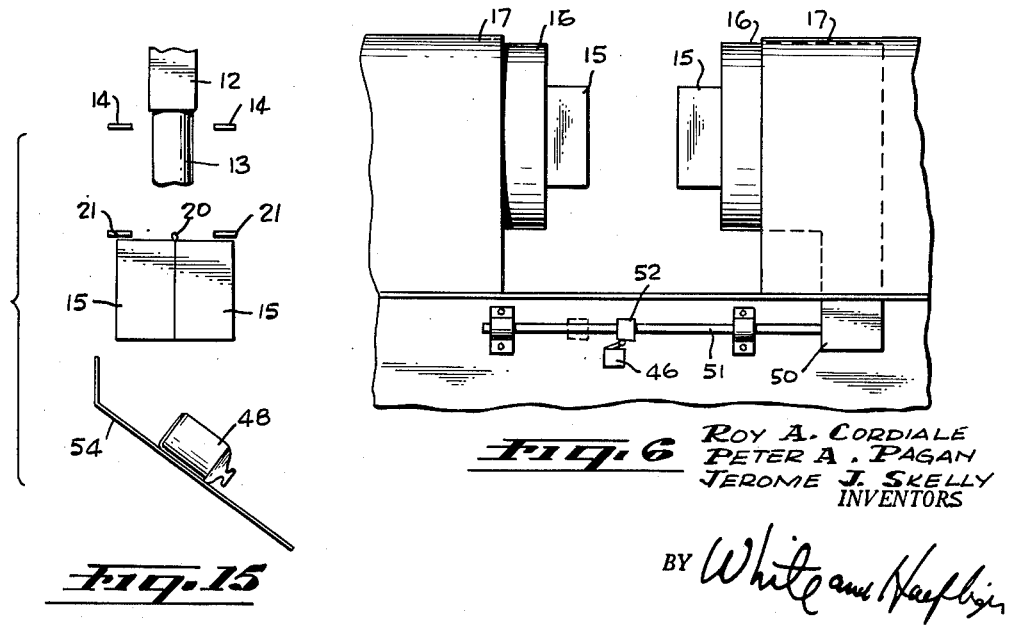

United States Patent Office 3,211,815
Patented Oct. 12, 1965

3,211,815
MOLDED BOTTLE EJECTION APPARATUS
AND METHOD
Roy A. Cordiale and Peter A. Pagan, Huntington Park, and Jerome J. Skelly, South Gate, Calif., assignors to Purex Corporation, Ltd., South Gate, Calif., a corporation of California
Filed Mar. 5, 1962, Ser. No. 177,424
22 Claims. (Cl. 264—94)

This invention relates generally to molding methods and apparatus, and more particularly concerns the handling of plastic articles formed during blow molding operations.

The methods of the invention are particularly adapted for use in molding operations wherein plastic material is blown into article shape within a zone or zones formed by releasable die structure. Ejection of the molded articles is conventionally carried out upon release of the die structure as by manually reaching between the briefly open dies to pull the articles free before die closure, or alternatively by air jetting the articles out from between the opened dies. Problems associated with these procedures include the danger of die closure upon the hand of the operator reaching between the dies, and malfunctioning of air jet ejection, particularly in those unavoidable instances where the articles stick in or on the die metal as where abnormally shaped bottles are formed, and such problems become acute upon speeding up of the die opening and closing cycle. Accordingly, a need has arisen for methods and apparatus to secure positive and foolproof plastic article ejection from die structure, particularly in high speed blow molding operations.

The present invention has been found in practice to meet this need, thereby solving the problem of assured article ejection. Broadly speaking, it contemplates the holding and releasing of plastic flash exteriorly of the article forming zone, the flash being held with the article attached thereto during die release and the flash being released after die release and in such relation to the die structure that the plastic articles are free of interference therewith. For this purpose means may be provided for holding the flash in what may be termed advanced location during die release, for transferring the flash with the article attached thereto from advanced to retracted location, and for releasing the flash after the transfer.

The flash is typically characterized as being hardenable from plastic state upon cooling, and the invention further contemplates increasing the flash hardness while the article is being molded, as by directing a stream of cool air against the hot flash. The flash will then have sufficient strength, when grasped, to remain attached to the plastic article during subsequent force application to the article as during article separation from the die structure, and as during transfer of the article by suspension from the displaced flash.

Other objects of the invention include the integration of the method and apparatus of the invention with the operation of mechanism acting to repeatedly transfer raw plastic material from a pick up station to a delivery or article forming station, such mechanism gripping the same portion of the material which becomes the flash, as will be described.

Advantages of the invention include the elimination of the hazard of manually reaching between briefly open dies, the enablement of sorting out containers of various designs and shapes, the freedom of the formed articles from being deformed as by engagement therewith of mechanical ejection tools, the maintenance of separation between the hot flash and article suspended therefrom to prevent undesirable bonding therebetween, the speeding up of the molding cycle without detrimentally affecting article quality, and the saving of compressed air otherwise used to jet eject articles from molds.

These and other objects and advantages of the invention, as well as the details of an illustrative embodiment, will be more fully understood from the following detailed description of the drawings, in which:

FIG. 1 is a side elevation showing the general organization of the blow molding and plastic article retrieval equipment;

FIG. 2 is an enlarged plan view of the equipment shown in FIG. 1;

FIG. 3 is an enlarged section taken on line 3—3 of FIG. 2;

FIG. 4 is an enlarged section taken in end elevation showing the plastic article retrieval or holding means actuated to article holding condition;

FIG. 5 is an enlarged plan view taken on line 5—5 of FIG. 4;

FIG. 6 is an enlarged end elevation showing a carriage actuator control actuated in response to die section movement;

FIG. 7 is a schematic showing of the actuator controls; and

FIGS. 8–15 are schematic showings of different stages in the operation of the article retrieval equipment.

Referring first to FIG. 1, the blow molding equipment 10 is shown to include structure 11 supporting a head 12 from which tubular parisons 13 are continuously extruded downwardly, so as to be cut off and transferred downwardly by knives 14. The latter carry the parison sections between pairs of die sections better shown at 15 in FIGS. 2 and 3, the sections being carried on platens 16 which are actuated by structure within the housings 17, so as to cause the opposite die sections to move toward one another as shown by the broken line 18 for enveloping the parisons. When enveloped by the closed die sections, the plastic material of the parisons is subjected to blowing into close conformance with the cavities or forming zones 60 of the die sections, an air pressure nozzle being indicated at 19 in FIG. 11 after having moved relatively upwardly into the lower portion of a closed die section for injecting compressed air into the parison.

In this regard, FIG. 8 shows the parison material being extruded downwardly between the transfer knives 14, with the die sections 15 closed upon a previously transferred parison, which is subjected to blow molding. In FIG. 9, the upper or auxiliary knives 14 have closed upon the parison section 13, and specifically upon the flash portion 20 thereof, and the die sections 15 have been opened. In FIG. 10 the parison section 13 has been transferred downwardly between the open die sections 15, and in FIG. 11 the die sections are closed upon the transferred parison. FIG. 12 shows the auxiliary knives 14 opened away from the flash portion 20 and lifted back upwardly into position for closing upon a subsequent parison.

Coming now to the description of the equipment with which the invention is particularly concerned, it includes means for holding and releasing the flash 20, and other means including controlled actuator structure and transfer structure for causing the holding means to hold the flash in advanced location during die release, to transfer the flash with the formed article or articles attached thereto from advanced location to retracted location free of interference with die closure, and to release the flash after the transfer. One form of means for holding and releasing the flash is shown at 21 to comprise a pair of jaws or knives which are movable to close upon the flash portion 20 as shown in FIG. 13, and also to release the flash portions as shown in FIG. 15. The knives are shown to have small teeth 22 along edges thereof which close toward the parison flash for positively gripping the latter upon knife closure. In this connection, parison material may typically comprise a plastic which is subject to hardening upon cooling, it being understood that the extruded parisons are hot and moldable. Typically, the organic plastic may comprise linear polyethylene.

Means for cooling the flash by contacting same with a stream of cooling gas is included and may for example take the form of air jets 23 supplied from a manifold 24 and carried on one platen 16 as shown in FIG. 2, the jets being directed toward the flash 20 as best shown in FIG. 8, a valve or valves 24 being controllable to pass compressed air to the jets after closure of the die sections 15 upon the parisons for blow molding purposes. In this connection, the jets are sufficiently spaced apart or from the flash 20 so as not to interfere with the operation of the knives 21.

One form of transfer structure as mentioned is shown in FIGS. 2 and 3 to include a carriage or movable carrier 25 from which the knives 21 are suspended for lateral movement toward and away from each other. The knife suspension is better shown in FIG. 4 to include carrier plates 26 suspended from the carrier crosspiece 26 so as to extend in vertical and longitudinal parallel planes, with lateral spacing therebetween to accommodate carrier tie rods or slides 28 as shown in FIGS. 4 and 5. Mounted on the latter for lateral movement thereon are the carrier blocks 29 to the lower extensions 30 of which the knives 21 are attached.

Controlled actuator structure is shown at 31 for causing the knives 21 to close on the flash and also to release the flash. Such actuator structure may include pneumatic or hydraulic actuator cylinders 32 suspended at 33 from the carriage crosspiece 27. Actuator rods 34 project laterally from the cylinders for connection at 35 to the carriage blocks 29, and it will be understood that actuator operation displaces the blocks 29 and therefore the knives 21 laterally between open and closed position with respect to the flash.

The transfer structure shown also includes longitudinal guides 36 supporting opposite end portions of the carrier crosspiece 27 in such a manner that the carrier is slidable or movable longitudinally between retracted location as shown in FIGS. 2 and 3 and advanced location characterized in that the knives 21 occupy the position shown in broken lines at 37 in FIG. 2. The guide rods 36 are in turn carried by suitable supporting frame structure 38.

An additional controlled actuator is shown at 39 in FIGS. 2 and 3 for actuating the carriage between advanced and retracted locations and the actuator may typically comprise a pneumatic or hydraulic cylinder 40 and an actuator rod 41 extending longitudinally from the cylinder for connection at 42 to the carriage crosspiece 27. In this regard, the actuator 39 may be suitably joined to the frame structure 38 as indicated at 43.

FIG. 7 shows that the knife actuators 30 and 31, and the carriage actuator 39 are controlled as by suitable microswitches shown at 44–47, with the numbering of these microswitches corresponding to the sequential operation of the actuators. Accordingly, switch 44 corresponds to desired operation of the carriage actuator 39 to advance the carriage to advanced location, switch 45 corresponds to operation of the knife actuators 30 and 31 to move the knives to closed position, switch 46 corresponds to desired operation of the carriage actuator to move the carriage to retracted location, and switch 47 corresponds to desired operation of the knife actuators to move the knives to open position for releasing the flash suspending the formed articles. In this connection, FIGS. 2 and 3 show the articles in broken lines at 48 after they have been displaced or moved to retracted location, but before they have been released as by releasing the flash 20. Before leaving FIG. 7, it will be observed that a timer 49 is located in the circuit or loop which includes the switch 44 and the carriage actuator 39, the timer delaying advancement of the carriage for a predetermined interval. Such a timer may be included where the microswitch 44 is located as in FIG. 12 to be triggered by upward displacement of auxiliary knives 14, it being understood that once the actuator 39 is operated to advance the carriage, movement of the latter to advanced location, as shown by the positions of the knives 21 in FIG. 12, will immediately result in triggering of the microswitch 45 by the carriage to cause the knife actuators 30 and 31 to move the knives 21 to closed position for holding or gripping the flash as seen in FIG. 13. In other words, the timer or delay 49 allows sufficient time for cooling of the flash as by jetting streams of cool air thereon to harden the flash prior to knife closure upon the latter.

The knives 21 remain closed upon the flash 20 as shown in FIG. 14 as the die structure is released, for example during movement of the die sections 15 away from the formed article or articles 48. Accordingly, the flash 20 gripped by the knives 21 restrains movement of the articles 48 with the die sections, and if necessary pulls the articles loose from the die sections to prevent sticking, the hardening of the flash strengthening it for preventing separation of the latter from the articles themselves. As the die sections move apart, the microswitch 46 is triggered, one method of bringing this about being shown in FIG. 6. As illustrated, the movable platen 16 of one die section 15 typically has a lower extension 50 which moves a rod 51 laterally to carry a triggering block 52 into engagement with the microswitch arm at the moment when retraction of the carriage is to be initiated. Accordingly, the actuator 39 retracts the carriage 25 to the position shown in FIGS. 2 and 3 at which time the microswitch 47 is triggered by engagement with the carriage crosspiece.

A second delay timer 53 is shown in the control loop that includes the microswitch 47 and the actuators 39 and 31 for delaying opening of the knives 21 for an interval of time sufficient to allow stoppage or near stoppage of swinging of the retracted articles 48. This is done so that the articles, when released, will not fall out of vertical alignment with the respective sorting chutes 54 opening upwardly toward the retracted article in FIG. 3. Accordingly, the articles will fall into the appropriate chutes for downward sliding travel as shown in FIG. 15 to appropriate conveyors or other receivers. This feature is especially important with articles of different size, as for example is shown by comparison of the articles 48 and 56 in FIG. 3, it being important that the larger articles do not fall into the small article chute and vice versa.

We claim:

1. The method that includes blow molding a plastic article within separable die sections from between which doubled thickness of the plastic projects as flash, grasping the flash, and separating the sections from contact with the molded article only after the projecting flash is first grasped to assure freeing of the sections from the molded article.

2. The method that includes blow molding a plastic article within separable die sections from between which and above which doubled thickness of the plastic projects as flash, grasping the flash, and separating the sections from contact with the molded article only after the projecting flash is first grasped to assure freeing of the sections from the molded article, and effecting relative bodily displacement of said flash and said separated die sections to permit closure of the die sections without interference with the formed articles.

3. The method that includes blow molding a plastic article within separable die sections from between which and above which doubled thickness of the plastic projects as flash, grasping the flash, and separating the sections from contact with the molded article only after the projecting flash is first grasped to assure freeing of the sections from the molded article, and increasing the flash hardness before die section separation by contacting the flash with a stream of cooling gas.

4. The method that includes blow molding a plastic article within separable die sections from between which and above which doubled thickness of the plastic projects as flash, grasping the flash, and separating the sections from contact with the molded article only after the projecting flash is first grasped to assure freeing of the sections from the molded article, thereby to transfer the weight of the article to the flash, bodily displacing said flash relative to said separated die sections to displace the article and thereby permit closure of the die sections without interference with the formed article, and releasing the flash.

5. The method of claim 4 in which the flash is characterized as hardenable from plastic state upon cooling, and including the step of increasing the flash hardness during molding of the article by contacting the flash with flowing cooling air.

6. The method of claim 4 including delaying said bodily displacement of the flash until said article is completely released by said sections.

7. The method of claim 4 including delaying release of said flash until swinging movement of the displaced article relative to the suspending flash is substantially eliminated, said swinging movement resulting from said bodily displacement of the flash.

8. The method of claim 4 including receiving said released articles in predetermined sorting zones.

9. In the method of handling plastic material during a plastic blow molding operation in which an integral tubular body of plastic material is formed into an article within releasable die structure, the steps including gripping and displacing a double thickness flash portion of the body to transfer the main extent of the body into position to be formed within said die structure, with said flash portion projecting upwardly therefrom, effecting blow-forming of said article within said die structure, gripping said flash portion with the article attached thereto while separating said structure from contact with the article, and releasing said flash portion after said die separation.

10. In the method of handling plastic material during a plastic blow molding operation in which an integral tubular body of plastic material is formed into an article within releasable die structure, the steps that include operating first gripping and transfer means to grip and transfer a double thickness flash portion of the body thereby delivering the main extent of the body into position to be formed within said die structure, with said flash portion projecting upwardly therefrom, effecting blow-forming of said article within said die structure, operating second gripping means to grip said flash portion of the article with the article attached thereto while separating said structure from contact with the article, and operating said second means to release said flash portion after said die separation.

11. The method of claim 10 including the step of operating said second means to transfer said flash portion with the article suspended therefrom relatively away from said die structure to permit closure thereof without interference with the article, prior to release of said flash portion by said second means.

12. The method of claim 10 in which said first means is operated to release and move away from said flash portion before said second means grips said flash portion.

13. For combination with equipment of the character described and including separable die sections having a forming zone interiorly of which a plastic article is blow-formed and exteriorly of which doubled thickness flash integral with the article projects, the improvement which comprises means for holding and releasing said flash, said means having a position in which it grasps the double thickness flash before and during said die separation, and other means for causing said first means to hold the flash with the article attached thereto before and during said die section separation and to release the flash after said die separation.

14. For combination with equipment of the character described and including separable die sections having a forming zone interiorly of which a plastic article is formed and exteriorly and above which doubled thickness flash integral with the article projects, the improvement which comprises means for holding and releasing said flash, said means having a position above the die sections in which it grasps the double thickness flash before and during said die separation, and other means including controlled actuator structure and transfer structure for causing said first means to hold the flash in advanced location before and during said die section separation, to transfer the flash with the article attached thereto from advanced location to retracted location free of interference with die section closure, and to release the flash after said transfer.

15. The invention as defined in claim 14 in which said transfer structure includes a movable carrier for said first means and a carrier support, and said actuator structure is operable to move said carrier on said support between advanced and retracted locations and also to displace said first means to close on the flash in said advanced location and to release the flash in said retracted location.

16. The invention as defined in claim 15 in which said first means includes a pair of jaws and said controlled actuator structure includes a first control placed to operate the actuator structure so as to move said carrier from retracted to advanced location only after the die structure is closed.

17. The invention as defined in claim 16 including an auxiliary pair of jaws to grip and transfer the double thickness flash portion of a plastic body between a pick-up station and a delivery station in which the main extent of the body is delivered for forming into said article interiorly of said die structure, said first control being placed to operate as described upon return movement of said auxiliary jaws from said delivery to said pick-up station.

18. The invention as defined in claim 16 in which controlled actuator structure includes a second control placed to operate the actuator structure to displace said first jaws to close on the flash only after the carrier has arrived at advanced location.

19. The invention as defined in claim 16 in which controlled actuator structure includes a third control placed to operate the actuator structure to move the carrier from advanced to retracted location only after release of the die structure.

20. The invention as defined in claim 19 in which controlled actuator structure includes a fourth control placed to operate the actuator structure to displace said jaws to release the flash with the article attached thereto only after the carrier has arrived at retracted position.

21. The invention as defined in claim 16 in which said jaws are sized to hold the flash of multiple articles, and including receptacles for separately and selectively receiving the released articles dropping after arrival thereof at said retracted location, said controlled actuator structure including control means for operating said jaws to release the flash only after a time delay allowing the articles attached to the flash to become oriented at said retracted location to selectively fall into said receptacles.

22. The invention as defined in claim 14 in which the projecting flash is characterized as hardenable from hot plastic state upon cooling, and including means for directing a stream of cooling gas at the hot flash to harden same and thereby prevent detachment of the flash from the formed article while the flash is held by said first means.

(References on following page)

References Cited by the Examiner

UNITED STATES PATENTS

| | | | |
|---|---|---|---|
| 1,915,357 | 6/33 | Fernberg | 264—334 |
| 2,783,503 | 3/57 | Sherman. | |
| 2,967,328 | 1/61 | Shelby et al. | |
| 3,040,376 | 6/62 | Elphee | 18–5 |
| 3,040,376 | 6/62 | Elphee | 18—5 |

FOREIGN PATENTS 1,249,682  11/60  France.

ROBERT F. WHITE, *Primary Examiner.*

MICHAEL V. BRINDISI, ALEXANDER H. BRODMERKEL, *Examiners.*